United States Patent [19]
Clark

[11] Patent Number: 4,798,441
[45] Date of Patent: Jan. 17, 1989

[54] FIBER OPTIC DEVICE COUPLING

[75] Inventor: Kenneth M. Clark, Irvine, Calif.

[73] Assignee: ITT Corporation, New York, N.Y.

[21] Appl. No.: 23,176

[22] Filed: Mar. 9, 1987

[51] Int. Cl.⁴ .................................................. G02B 6/42
[52] U.S. Cl. ..................................................... 350/96.2
[58] Field of Search .................. 350/96.2, 96.21, 96.22

[56] References Cited

U.S. PATENT DOCUMENTS

| | | | |
|---|---|---|---|
| 3,068,443 | 12/1962 | Nava et al. | 339/217 |
| 3,158,424 | 11/1964 | Bowen | 339/217 |
| 3,165,369 | 1/1965 | Maston | 339/59 |
| 3,277,990 | 1/1966 | Nava | 339/94 |
| 3,336,569 | 8/1967 | Nava | 339/217 |
| 3,370,264 | 2/1968 | Kelly et al. | 339/217 |
| 3,947,182 | 3/1976 | McCartney | 339/74 |
| 3,951,514 | 4/1976 | Medina | 350/96 |
| 3,963,323 | 6/1976 | Arnold | 350/96 |
| 3,984,174 | 10/1976 | Landgreen | 350/96.22 |
| 4,140,365 | 2/1979 | Burger et al. | 350/96.20 |
| 4,140,366 | 2/1979 | Makuch et al. | 350/96.22 |
| 4,140,367 | 2/1979 | Makuch et al. | 350/96.22 |
| 4,699,456 | 10/1987 | Mackenzie | 350/96.20 |

FOREIGN PATENT DOCUMENTS 0160117  9/1984  Japan ................................ 350/96.2

*Primary Examiner*—John D. Lee
*Assistant Examiner*—John Ngo
*Attorney, Agent, or Firm*—T. L. Peterson

[57] ABSTRACT

A coupling for connecting an optical fiber cable to an electro-optical device which is suitable for both single and multi-channel applications. The coupling utilizes a standard connector contact which is releasably mounted in the coupling by means of a contact retention clip. An O-ring is mounted in the coupling between a shoulder in the contact cavity and a shoulder on the contact which prevents the forward mating end of the contact from damaging the active face of the electro-optical device in the coupling, and prevents longitudinal rattle of the contact.

6 Claims, 2 Drawing Sheets

FIBER OPTIC DEVICE COUPLING

BACKGROUND OF THE INVENTION

The present invention relates generally to a fiber optic device coupling and, more particularly, to a coupling for connecting an optical fiber cable to an electro-optical device which is suitable for both single and multi-channel applications.

Presently, a threaded coupling nut is the most popular means of holding a fiber optic contact relative to an electro-optical device, such as a light-emitting diode or light-receiving device. Typically, parts of coaxial or RF type of electrical connectors, such as those known in the industry as being SMA connectors, have been used for coupling fiber optic contacts and electro-optical devices.

A shortcoming of the coaxial-type coupling is that it is limited to single channel applications which employ only a single contact and corresponding electro-optical device. In such a connector assembly, the contact is normally mounted firmly in a fixed position by suitably arranged shoulders on the contact and the connector housing, so that there is no longitudinal play of the contact which could result in the end of the contact engaging the active end face of the electro-optical device, which typically includes a fragile window which could be damaged if forcibly engaged by the contact.

It would be highly desirable if a coupling of the type to which this invention pertains could employ contacts that are typically utilzied in multi-channel fiber optic connectors, so that a common contact could be used for the connectors and couplings for active devices, and further to allow selective removal of the contacts from multi-channel coupling assemblies. Such selective removal of contacts is permissible with many conventional multi-channel fiber optic connectors. For example, one standard multi-channel fiber optic connector utilizes a contact retention clip to releasably retain the contact in the assembly. Such an arrangement is disclosed in U.S. Pat. No. 3,947,182 to R. L. McCartney, assigned to the assignee of the present application. In the McCartney patent, an O-ring is used in cooperation with a slidable sleeve in which the contact is mounted so that when the mating halves of the connector engage, the contacts will engage with a positive abuttment force due to the compression of the O-ring. The positive engagement of the mating end faces of the contacts is highly desirable in a fiber optic connector to prevent light loss at the interface of the fiber optic cables. In contrast, in a coupling for connecting an optical fiber cable to an electro-optical device, it is desirable to prevent the contact from engaging the active face of the device. Accordingly, it is desirable that the contact not be capable of moving longitudinally in the coupling after it is mounted therein.

It is an object of the present invention to provide a fiber optic device coupling for connecting an optical fiber cable to an electro-optical device in either a single or multi-channel system that allows the use of a standard fiber optic connector contact that is removably mounted in the coupling, yet prevents the contact from forcibly engaging the fragile active face of the device.

SUMMARY OF THE INVENTION

According to a principal aspect of the present invention, there is provided a fiber optic device coupling for connecting an optical fiber cable to an electro-optical device suitable for multi-channel as well as single-channel applications. A conventional fiber optic contact, terminated to the fiber optic cable, is mounted in one end of the passage or contact cavity extending through the housing of the coupling, while an electro-optical device is mounted in the opposite end of the passage. The contact is removably mounted in the passage by a suitable contact retention clip. Resilient means is disposed between a forwardly facing shoulder on the contact and an oppositely facing shoulder in the wall of the passage in the coupling, which provides a stable separation between the mating end face of the contact and the active face of the device, thereby preventing the contact from forcibly engaging the active face of the device. Thus, the present invention avoids damage to the device when the coupling is subjected to vibration. Further, the resilient means maintains the contact firmly engaged with the contact retention finger of the clip to prevent longitudinal rattle of the contact which could impair the functioning of the coupling.

DESCRIPTION OF THE PREFERRED EMBODIMENTS

Figure 1:
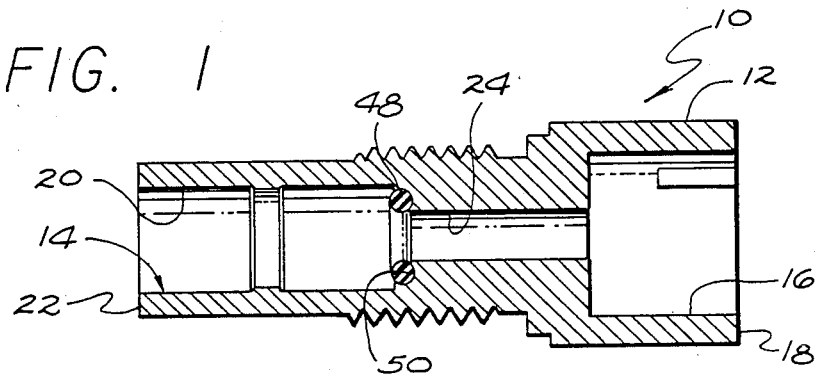
FIG. 1 is a longitudinal sectional view through the coupling of the present invention, with the fiber optic contact and electro-optical device removed therefrom.
Figure 2:
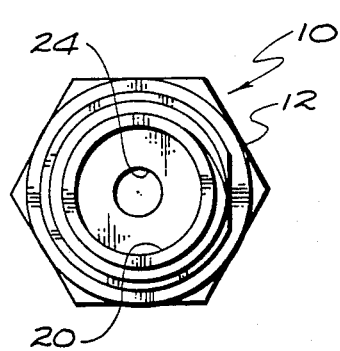
FIG. 2 is an end view, showing the left end of the coupling illustrated in FIG. 1.
Figure 3:
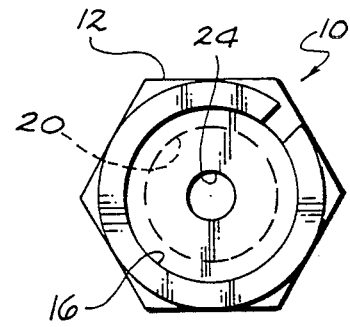
FIG. 3 is an end view, showing the right end of the coupling illustrated in FIG. 1.
Figure 4:
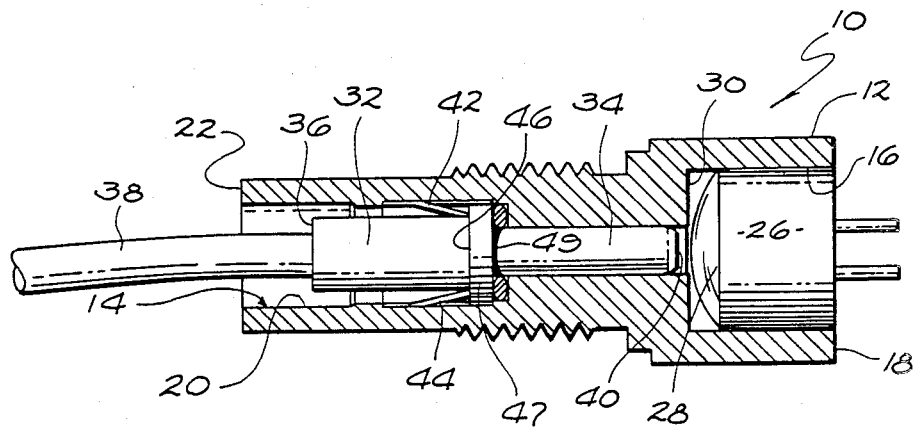
FIG. 4 is a partial longitudinal sectional view through the coupling of the present invention, with the fiber optic contact and device mounted therein.

Referring now to FIGS. 1-4 of the drawings in detail, the fiber optic device coupling of the present invention, generally designated 10, comprises a housing 12 having a passage 14 extending longitudinally therethrough. The passage includes a first relatively large diameter section 16 which opens at the right end 18 of the housing as viewed in FIG. 4, a slightly smaller diameter second section 20 which opens at the opposite end 22 of the housing, and an immediate somewhat smaller diameter third section 24 which communicates with the first section 16 and second section 20 of the passage.

An electro-optical device, generally designated 26, is mounted in the section 16 of the passage 14. The device may be a light emitting diode or light receiving diode, or the like. The device has an active face 28 which is positioned closely to the annular shoulder 30 formed at the junction of the two passage sections 16 and 24. Typically, the active face has a fragile glass window which can be fractured if too much force is applied thereto, such as could occur if a contact were allowed to vibrate against the window.

A fiber optic contact 32 is mounted in the section 20 of passage 14. The contact has a reduced diameter front part 34 which has a sliding fit within the third section 24 of the passage 14. The rear 36 of the contact receives a fiber optic cable 38 that extends rearwardly from the coupling. The light conductor in the cable may be either a single fiber or a fiber bundle. The conductor, not shown, extends to the forward mating end face 40 of the contact.

The contact is releasably mounted in the coupling by means of a contact retention clip 42. The contact retention clip 42 is fixedly mounted in the section 20 of the contact passage. The clip has a resilient, inwardly and forwardly extending contact retention fingers 44 that engage a rearwardly facing annular shoulder 46 provided by an enlargement 47 on an intermediate section of the contact 32. The fingers can be removed from the shoulder 46 by use of a suitable contact insertion/extraction tool (not shown) to allow the removal of the contact from the housing 12 in a manner well known in both the electrical and fiber optic connector art, and described in some detail in the aforementioned McCartney patent. In the contact mounting arrangement described so far, the contact would be free to make some longitudinal movement in the housing, since a slight gap is typically required between the enlargement 47 and an opposing annular shoulder in the passage in order to assure that the enlargement can pass beyond the free end of the retention fingers when the contact is inserted in the housing to assure that the fingers can spring inwardly behind the shoulder 46 when the contact insertion/extraction tool is withdrawn from the housing. Such slight movement would allow for longitudinal rattle of the contact when the coupling is subjected to vibration, which could result in the forward mating end of the contact breaking the active face 28 of the device 26.

In accordance with the present invention, in order to avoid such problem and to assure that a stable separation is provided between the mating end face 40 of the contact and the active face of the device, a resilient member, such as an elastomeric O-ring 48, is positioned in the space defined between the forwardly facing shoulder 49 formed by the enlargement 47 on the contact and the annular shoulder 50 formed at the junction of the sections 20 and 24 of passage 14. The axial length of the enlargement 47 is selected such that the O-ring will be slightly compressed when the contact is fully installed in the passage 14 with the ends of the contact retention fingers 44 bearing against the rearwardly facing shoulder 46 on the contact. Since the O-ring is slightly compressed, it urges the enlargement 47 rearwardly so that there will be a firm engagement between the ends of the contact retention fingers and the shoulder 46, thereby preventing any longitudinal rattle of the contact in the housing 12. Further, the size and material of the O-ring and the axial length of the front part 34 of the contact are selected such that the forward mating end face 40 of the contact is always maintained out of engagement with the active face 28 of the device 26. Preferably, the end face 40 of the contact is spaced slightly behind the shoulder 30 in the passage 14. Thus, the O-ring serves as a resilient spacer and cushion to provide a stable separation between the forward mating end face of the contact and the active face of the device, thereby preventing the active face 28 from being damaged even when the coupling is subjected to high vibrations.

Figure 5:
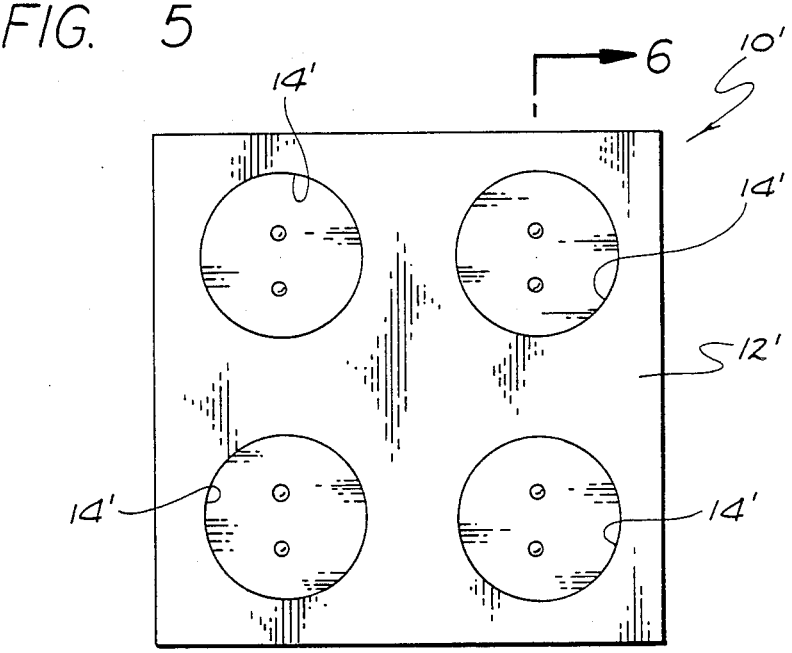
FIG. 5 is an end view of a multi-channel coupling in accordance with an alternative embodiment of the present invention.
Figure 6:
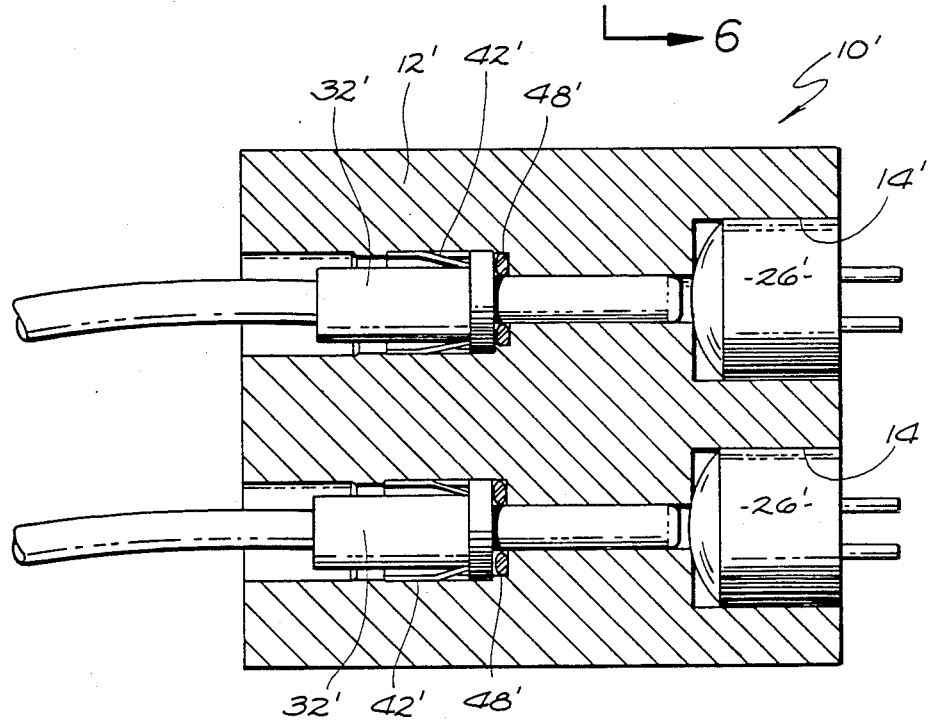
FIG. 6 is a vertical sectional view taken along line 6—6 of FIG. 5.

As will be appreciated, the coupling illustrated in FIGS. 1-4 is a single channel arrangement serving to couple a single fiber optic contact to an electro-optical device. The embodiment of the invention illustrated in FIGS. 5 and 6 is a multi-channel coupling, having four channels or sets of contacts and devices by way of example only. In this embodiment, the basic structure is as previously described and like numbers primed are used to indicate like or corresponding parts. The coupling 10' in FIGS. 5 and 6 differs from the first embodiment of the invention primarily in that the housing 12' is shown as being a rectangular block containing four passages 14'. Each passage contains a fiber optic contact 32'. Contact retention clip 42', O-ring 48' and electro-optical device 26', all constructed and assembled in the same manner as described in connection with the coupling 10. While the housing 12' is shown as being rectangular, it could have other shapes, such as circular. Further, the coupling 10' could contain more or less number of channels with mating contacts and devices.

In each embodiment of the invention, the contacts can be removed from the coupling by the use of a suitable insertion/extraction tool inserted through the rear of the housing to deflect contact retention fingers of the clip 42 and 42', thus avoiding the necessity of uncoupling two parts of a coupling assembly, such as is required with a coaxial or SMA-type connector assembly typically used for coupling contacts to devices. Further, the present invention allows the use of a fiber optic connector contact, thus avoiding the need of using a specifically designed contact that will fit within a coaxial connector.

While the contact retention clip shown in the drawings and described specifically herein embodies retention fingers which extend inwardly and forwardly in the contact passage to engage behind a shoulder on the contact, other types of removable contact retention arrangements could be utilized in the present invention. For example, the contact retention clip could be mounted on the contact body itself, and cooperate with the shoulder formed in the wall of the passage in the coupling.

Although several embodiments of the invention have been disclosed herein for purposes of illustration, it will be understood that various changes can be made in the form, details, arrangement and proportions of the various parts in such embodiments without departing from the spirit and scope of the invention as defined by the appended claims.

What is claimed is:
1. A fiber optic device coupling for connecting an optical fiber cable to an electro-optical device comprising:
  a housing having a pasasge therethrough opening at the opposite ends of said housing;
  one end of said passage being adapted to receive an electro-optical device therein having an active face disposed toward the other end of said passage;
  a fiber optic contact mounted in the opposite end of said passage, said contact having a forward mating end face and a rear end, said rear being adapted to be connected to a fiber optic cable;
  radially movable, resilient contact retention means extending between said contact and the wall of said passage for releasably retaining said contact in said passage;
  a forwardly facing shoulder on said contact;
  a shoulder on the wall of said passage facing said contact shoulder and spaced therefrom; and
  resilient means compressed between said shoulders serving to prevent said forward mating end face of said contact from forcibly engaging the active face of an electro-optical device mounted in said one end of said passage, said compressed resilient means having sufficient resilience to substantially prevent longitudinal rattle of said contact within said passage.

2. A coupling as set forth in claim 1 wherein:
said contact embodies a rearwardly facing shoulder behind said forwardly facing shoulder; and
said contact retention means comprises a resilient finger extending inwardly from the wall of said passage in the direction toward said one end of said passage, said finger having a free end engaging said rearwardly facing shoulder.

3. A coupling as set forth in claim 2 wherein:
said resilient means urges said contact rearwardly facing shoulder against said free end of said finger.

4. A coupling as set forth in claim 3 wherein:
said resilient means is an O-ring.

5. A fiber optic device coupling comprising:
a housing having a passage therethrough opening at the opposite ends of said housing;
an electro-optical device mounted in one end of said passage, said device having an active face disposed toward the other end of said passage;
a fiber optic contact mounted in the opposite end of said passage, said contact having a forward mating end face and a rear end, said rear end being adapted to be connected to a fiber optic cable, said mating end face being slightly spaced from said active face of said device;
radially movable, resilient contact retention means extending between said contact and the wall of said passage for releasably retaining said contact in said passage;
a forwardly facing shoulder on said contact;
a shoulder on the wall of said passage facing said contact shoulder and spaced therefrom; and
resilient means compressed between said shoulders serving to prevent said forward mating end face of said contact from forcibly engaging said active face of said device when said coupling is subjected to vibration, said compressed resilient means having sufficient resilience to substantially prevent longitudinal rattle of said contact within said passage.

6. A fiber optic device coupling for connecting an optical fiber cable to an electro-optical device comprising:
a housing having a pasasge therethrough opening at the opposite ends of said housing;
one end of said passage being adapted to receive an electro-optical device therein having an active face disposed toward the other end of said passage;
a fiber optic contact mounted in the opposite end of said passage, said contact having a forward mating end face and a rear end, said rear end being adapted to be connected to a fiber optic cable;
said contact having forwardly and rearwardly facing shoulders thereon;
a radially movable, resilient contact retention finger extending inwardly from the wall of said passage and engaging said rearwardly facing shoulder on said contact in said passage;
a shoulder on the wall of said passage in front of and facing said contact forwardly facing shoulder and spaced therefrom;
resilient means disposed between said contact forwardly facing shoulder and the shoulder on the wall of said passage serving to prevent said forward mating end face of said contact from forcibly engaging the active face of an electro-optical device mounted in said one end of said passage; and
said resilient means being compressed between said contact fowardly facing shoulder and said shoulder on the wall of said passage, whereby said contact rearwardly facing shoulder is resiliently urged against said contact retention finger to substantially prevent longitudinal rattle of said contact within said passage.

* * * * *